July 18, 1944.  J. F. JOY  2,353,730
WHEEL MOTOR
Filed April 8, 1942   3 Sheets-Sheet 1
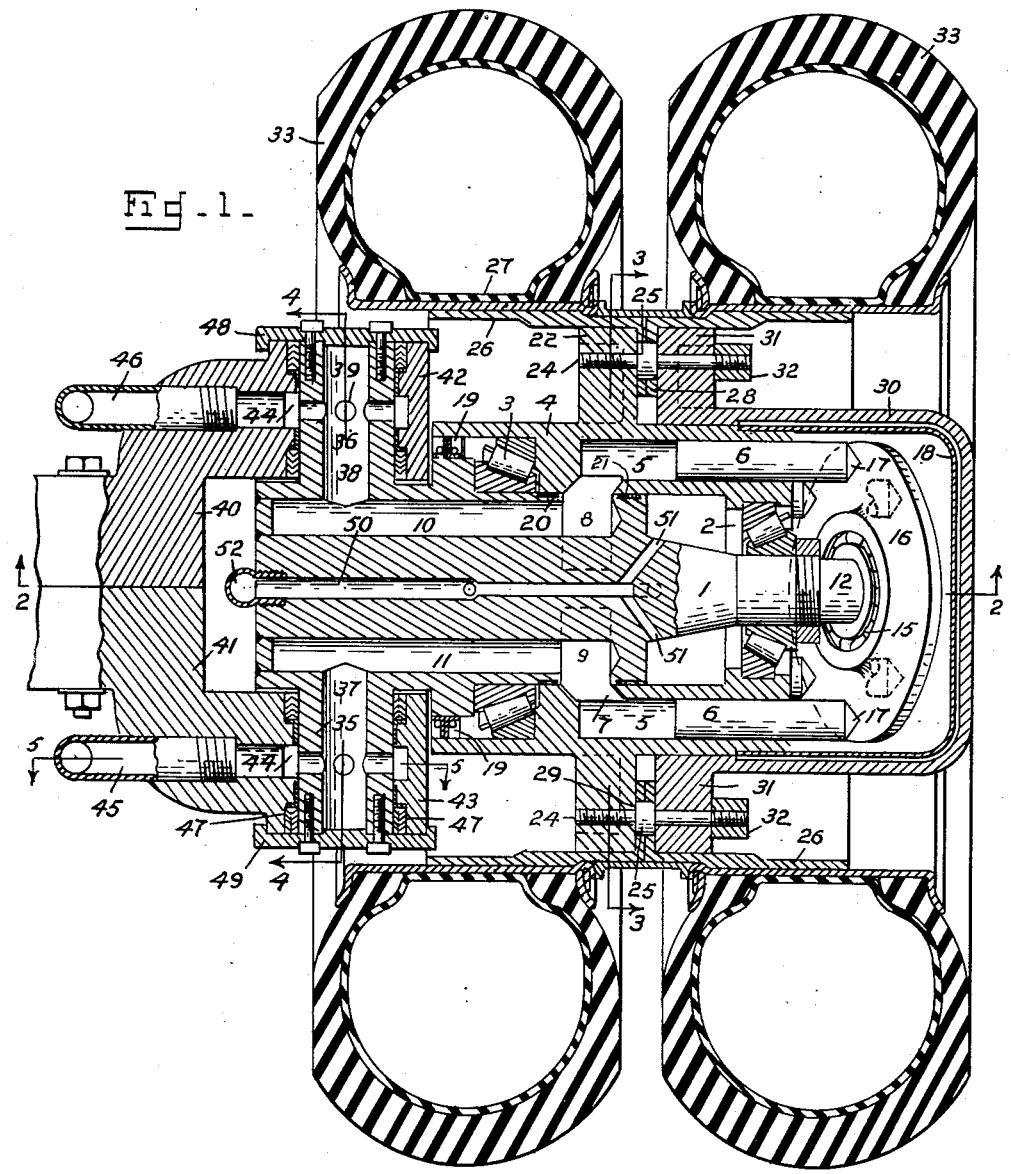
Inventor
Joseph F. Joy
By G. J. Kessenich & J. H. Church
Attorneys

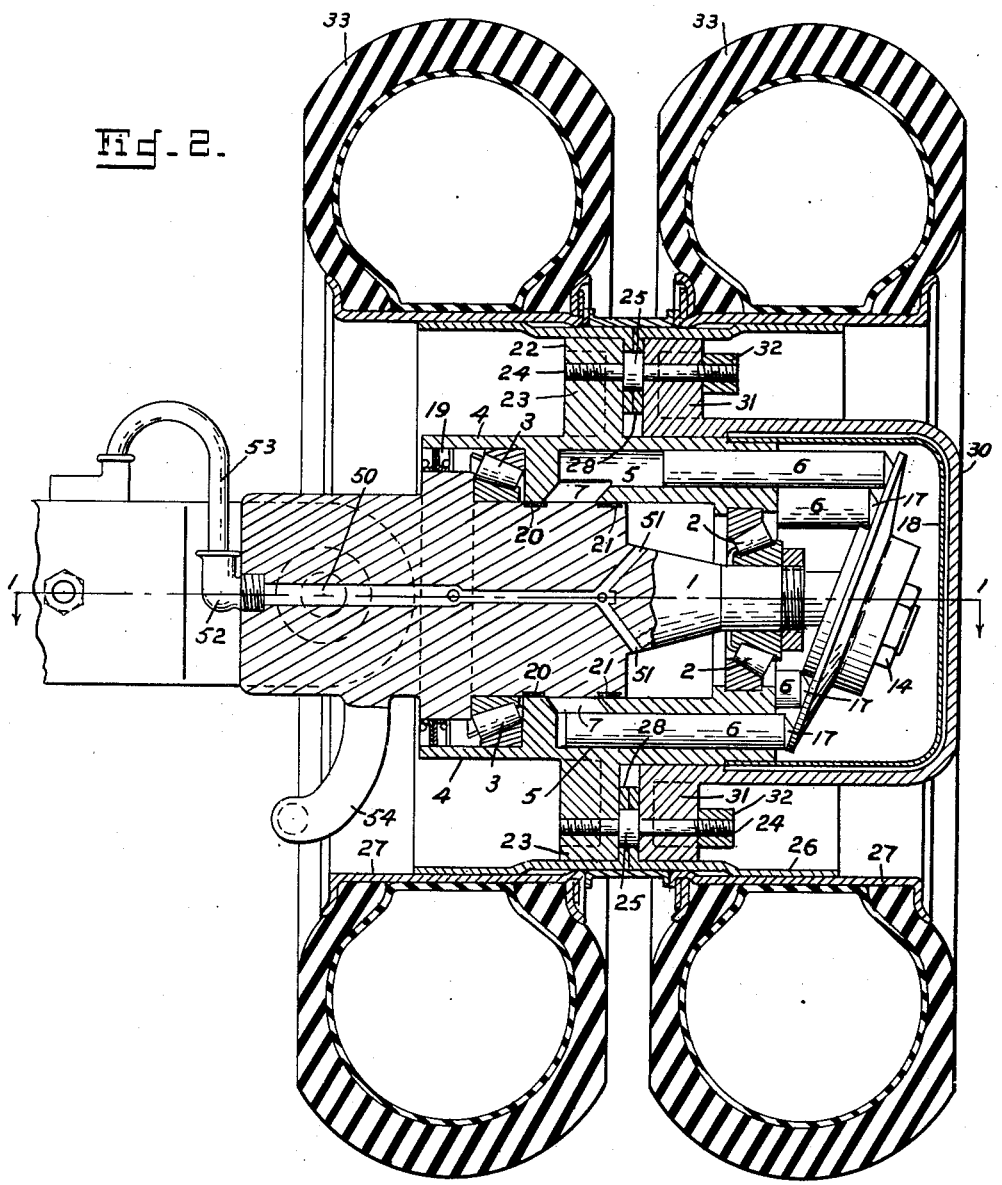

July 18, 1944.  J. F. JOY  2,353,730
WHEEL MOTOR
Filed April 8, 1942  3 Sheets-Sheet 3
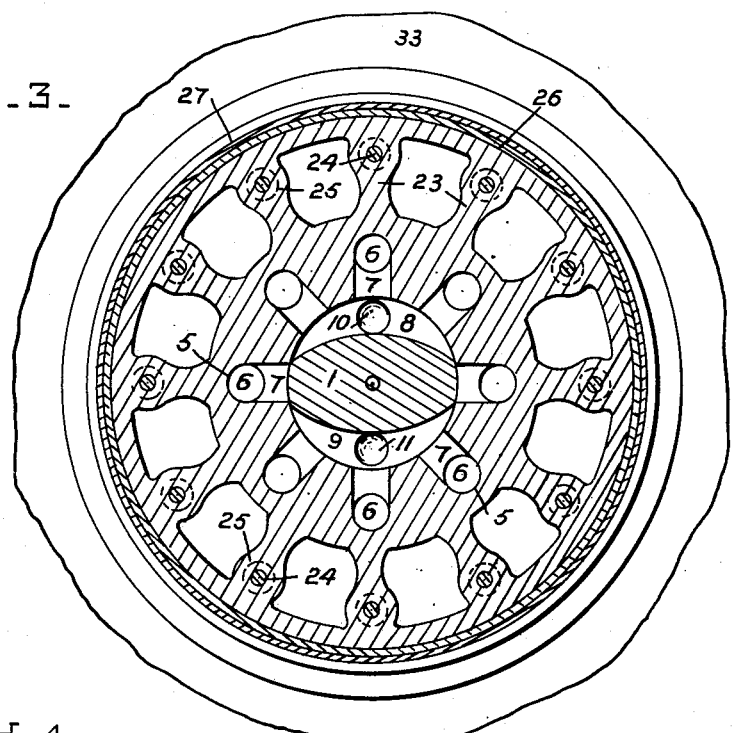
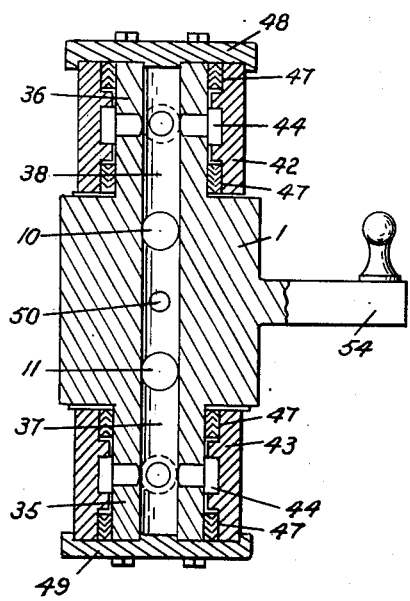
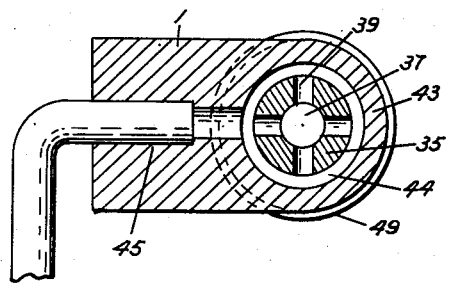
Inventor
Joseph F. Joy
By G. J. Kessenich & J. H. Church
Attorneys Patented July 18, 1944

2,353,730

UNITED STATES PATENT OFFICE 2,353,730

WHEEL MOTOR

Joseph F. Joy, Claremont, N. H.

Application April 8, 1942, Serial No. 438,061

9 Claims. (Cl. 180—66)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a hydraulic motor and more particularly to such a motor adapted for use as a vehicle wheel.

In the manufacture of wheeled vehicles, it is often desirable that all of the wheels be driven to provide for increased traction and maneuverability on difficult terrain. To adapt conventional vehicle drives to such an application requires the use of complicated transmissions, differential mechanisms, and other costly and power consuming systems including universal joints and gearing.

Accordingly it is an object of this invention to produce a vehicle wheel which forms a self-contained driving unit and functions without requiring the use of complicated gear drives.

It is a further object to produce a hydraulic motor of extreme simplicity and which will be economical to manufacture and maintain.

Such wheels may be used to great advantage on tanks of the trackless type, armored cars, trucks, self-propelling gun carriages, and all other types of automotive equipment intended for employment on roads or on natural terrain. Further use for such wheels might be found on trailer units coupled in a train to a main power unit to be controlled and to receive hydraulic power therefrom.

The exact nature of the invention as well as other objects and advantages thereof will clearly appear from a description of a preferred embodiment as shown in the accompanying drawings in which:

Figure 1 is a vertical longitudinal sectional view (on the line I—I of Fig. 2) of a vehicle wheel embodying my invention.

Figure 2 is a horizontal longitudinal sectional view on the line 2—2 of Fig. 1.

Figure 3 is a vertical sectional view on the line 3—3 of Figure 1.

Figure 4 is a vertical sectional view on the line 4—4 of Fig. 1.

Figure 5 is a horizontal sectional view on the line 5—5 of Fig. 1.

Referring to the drawings by characters of reference, there is shown a shaft 1 adapted to be secured to a vehicle body in non-rotating relation and on which there are arranged bearings 2 and 3 about which the substantially cylindrical motor body 4 is rotatable. A plurality of cylindrical bores 5 are formed in the body 4 equally spaced circumferentially and axially parallel with the axis of the shaft, a piston 6 being provided for reciprocation in each cylinder. Communicating between the head of each cylinder and the central bore which houses the shaft 1 are ports 7 and in the section of the shaft opposed to the ports 7 crescentoidal segments have been milled from the shaft to form a pair of symmetrical, opposed, valved ports 8 and 9. Fluid passages 10 and 11 lead through the shaft to the valve ports 8 and 9. An end portion 12 on the shaft 1 is disposed at an angle to the axis of the shaft proper in a plane which includes the horizontal centerline of Fig. 3 and provided with a shoulder and lock nut 14 between which bearings 15 may be clamped. Engaged by the bearings and rotatable thereon about the angular portion of the shaft is a wobble disk 16 adapted to cooperate with conical ends 17 on each of the pistons 6.

For the purpose of illustration of the operation of the motor it may be assumed that fluid under pressure is supplied to the motor through the conduit 10 in the shaft and that the conduit 11 is connected to the exhaust line. In that eventuality pressure will be applied through the crescentoidal port 8 and ports 7 to the cylinders presently in communication therewith. In the case assumed all of those pistons above the horizontal center line in Fig. 3 will have pressure applied thereto while the pistons below said center line will be connected to the exhaust line through the crescentoidal port 9 and passage 11. Each of the pistons to which pressure is applied will be forced outwardly in its cylinder and as the conical end 17 of the piston is in contact with the face of the wobble disk 16 will tend to rotate the wobble disk and the motor body 4 into a position in which the piston has attained a maximum displacement. As each piston in turn arrives at its position of maximum displacement it will pass from communication with the pressure passage into communication with the exhaust passage 11. It will be seen therefore that whenever pressure is applied through the passage 10 there will be a tendency for the motor body, as viewed in Fig. 3, to rotate about the axle in a clockwise direction. When the flow of fluid to the motor is reversed, that is, pressure applied through passage 11 and passage 10 connected to exhaust, the direction of rotation will be reversed and the motor body will tend to be rotated in an anti-clockwise direction about the shaft. Obviously, if the forces of gravity or inertia exceed the power supplied to the wheel there will be a tendency for the motor to pump fluid through the system. Under such a condition retardation of the flow of fluid through the motor by a throttling valve or the like will result in retardation of the rate of rotation while an absolute closure of the passages to the flow of fluid will lock the motor in a condition of rest. It will be seen, therefore, that through the manipulation of the control valves a wheel of this type may be smoothly accelerated or decelerated during rotation in either direction or may be positively locked at rest.

An end cap 18 is secured on the motor body to prevent the escape of oil and an oil retainer 19 engaging the body and the shaft fulfills a similar function at the opposite end of the shaft. Packing inserts 20 and 21 on the surface of the shaft at each side of the crescentoidal valve ports retard any tendency for oil to escape along the shaft. A flange 22 about the periphery of the motor body is provided with a plurality of internally threaded bosses 23 in each of which a double ended stud 24 having a central cylindrical head 25 is secured. Rims 26 each of which is adapted to secure a demountable rim 27, are provided with inturned flanges 28 having holes 29 adapted to cooperate with the cylindrical heads 25 on the studs 24. A cap 30 adapted to enclose the cap 18 is provided with a holed flange 31 adapted to fit over the studs 24 and to be secured thereon in clamping engagement with the inturned flanges 28 on the inner rims 26. Nuts 32 on the studs 24 and engaging the outer face of the flange 31 form a desirable securing means for the cap 30. Tires 33 may be mounted on the rims 27 or a track engaging sprocket or other direct or indirect driving means may be mounted on the motor body in place of the pneumatic tires 33.

It is obvious that to perform the dual function of carrying wheel and driving motor the end of the axle shaft 1 may be secured to the body of a vehicle or to flexible suspension means thereon. It has not, therefore, been felt to be necessary to show such an expedient as any simple arrangement which secures the end of the shaft and allows fluid to be fed to the conduits 10 or 11 will serve. The drawings show instead the adaptation of my improved motor to the problem of driving a vehicle by means of a front or other steerable wheel, and it is believed that the solution provided for that problem will further clarify the application of my wheel to operation along a relatively fixed line as for a rear vehicle wheel.

As best shown in Figs. 1 and 4 the inner end of the shaft 1 has been provided with a pair of offset arms 35 and 36 having a common axis at substantially a right angle to the axis of the shaft 1. Each of the offset arms is of circular cross section and is provided with an axial opening communicating with one of the passages in the interior of the shaft 1, the opening 37 in offset arm 35 communicating with the passage 11 and the opening 38 in offset arm 36 communicating with the passage 10 in shaft 1. Radial openings 39 in the offset arms communicate with the exterior surface thereof. The axle may comprise two similar end sections 40 and 41 which when secured in opposition to each other provide a bifurcated end on the axle comprising bearings 42 and 43, each adapted to receive one of the offset arms 35 or 36. A circumferential groove 44 is formed in the inner surface of each of the bearings 42 and 43 and fluid conduits 45 and 46 lead through the axle knees from the grooves 44. The provision of the groove insures that there will be no interruption of flow between either of the conduits in the offset arms and the conduits leading through the axle knees regardless of the direction the wheel may be turned in steering. Packing 47 insures that there will be no leakage longitudinally of the offset arms and end covers, 48 and 49, close the ends of the offset arms and serve to protect the packing members from dust and water. To provide for the inevitable although slight amount of leakage along each of the pistons and at the valve surfaces, an axial bore 50 has been formed in the shaft and placed in communication with the inner part of the motor body by transverse passages 51. The outer end of this bore may conveniently be provided with an elbow fitting 52 and connected to a flexible tubing 53 through which any excess of fluid in the motor body may be returned to the supply tank thus preventing the building up of excess pressures within the body of the motor. A steering arm 54 may be provided on the inner end of the shaft 1 to allow for controlling the direction taken by the wheel.

I claim:

1. Vehicle driving means comprising a non-rotatable axle adapted to be secured to a vehicle body, a motor body rotatable about said axle, a plurality of cylinders in said body and axially parallel to said axle, pistons in said cylinders, means carried by the axle for coupling said pistons for rotation about said axle, means to apply fluid pressure to said cylinders, and road engaging means on the periphery of said motor body.

2. Vehicle driving means comprising a non-rotatable axle shaft adapted to be steerably mounted on a vehicle body, a motor body rotatable about said axle, a plurality of cylinders in said body axially parallel to said axle shaft, pistons in said cylinders, means carried by the axle for coupling the end of said pistons for rotation about said axle, valve means for said cylinders on said axle, road engaging means on the periphery of said body and fluid conduit means extending through said shaft and said steerable mounting whereby fluid may be supplied to said valve means.

3. Vehicle driving means comprising a non-rotatable axle, a pair of fluid conduits through said axle, valve ports in said axle, each in communication with one of said conduits, a motor body journalled on said axle for rotation about the axis thereof, a plurality of cylinders of equal cross sectional area in said body parallel with the axis of rotation, a passage for each of said cylinders opening to said cylinder in opposition to said valve ports, pistons in said cylinders and projecting therefrom, a portion of said axle angularly disposed with relation to the axis thereof and a disk member journalled on said angularly disposed portion and engaging the projecting ends of said pistons.

4. Vehicle driving means comprising a non-rotating axle, an end portion on said axle being angularly disposed with relation to the main portion of said axle, a motor body journalled on the main portion of said axle, cylinders in said motor body axially parallel to the main portion of said axle, said cylinders being of equal cross sectional area fluid conduits in said axle selectively communicating with said cylinders, pistons reciprocable in said cylinders, and a thrust receiving disk in contact with the ends of said pistons, said disk being normal to the axis of and journalled on the angularly disposed end of said axle.

5. Vehicle driving means comprising an axle adapted to be fixed at one end to a mounting, an end portion of said axle opposite said fixed end angularly disposed with relation to the rest of said axle, a motor body journalled on said axle and rotatable about said axle, cylinders in said motor body in parallelism with the axis of said axle, fluid conduits leading to said conduits through said axle from said fixed end, valve means selectively placing said cylinders in communication with said conduits, pistons reciprocable in said cylinders and projecting therefrom, and a thrust receiving disk in contact with the projecting end of said pistons, said disk being normal to the axis of and journalled on the angularly disposed end of said axle.

6. Vehicle driving means comprising a non-rotating axle, an annular motor body journalled on said axle for rotation about the axis thereof, cylinders in said body parallel with the axis of rotation, a pair of fluid conduits in said axle, valve means selectively placing said conduits in communication with said cylinders, pistons reciprocable in said cylinders and thrust receiving means in contact with the ends of said pistons and journalled on said axle for rotation about an axis angularly disposed with relation to the axis of said axle.

7. A hydraulic motor adapted to serve as a vehicle wheel comprising a cylindrical body, road engaging means on the periphery of said body, a non-rotatable axle on which said body is journalled, means to secure said axle to a vehicle body, fluid conduits in said axle and passing through said securing means, cylinders in said body parallel with the axis thereof, valve means placing said cylinders selectively in communication with said conduits, pistons reciprocable in said cylinders, and thrust receiving means in contact with the ends of said pistons, said last mentioned means comprising a disk journalled on said axle for rotation about an axis angularly disposed with relation to the axis of said axle.

8. A vehicle driving means comprising a non-rotatable axle having an end portion angularly disposed with relation to the axis thereof, fluid conduits through said axle, a motor body journalled on the axle for rotation about the axis of said axle, a plurality of cylinders in said body, and parallel to the axis of the axle, a port in said body for each cylinder, said cylinders in communication with said conduits through said ports, valve means controlling said ports, pistons in said cylinders and piston operating means mounted on the angularly disposed end of the axle and cooperating with the fluid pressure in the cylinders to operate the pistons.

9. A vehicle driving means comprising a non-rotatable axle adapted to be secured to a vehicle body, a motor body rotatable about said axle, a plurality of cylinders in said rotatable body axially parallel with said axle, pistons in said cylinders and fluid conduits in said axle communicating with said cylinders, a pair of opposed arms on said axle, said arms having a common axis at substantially right angle to said axle, a pair of axle knees each adapted to embrace one of the opposed arms, axial bores in said arms communicating with said conduits for the admission therethrough of fluid under pressure, radial fluid passages in the sections of the arms embraced by the axial knees, circumferential grooves in said knees communicating with said radial fluid passages, fluid conduits communicating with said grooves, and means carried by the axle for coupling said piston for rotation about said axle.

JOSEPH F. JOY.